United States Patent
Hazumi

[15] 3,656,049
[45] Apr. 11, 1972

[54] VOLTAGE REGULATING DEVICE FOR GENERATORS

[72] Inventor: Kenji Hazumi, Tokyo, Japan
[73] Assignee: Sawafuji Electric Co., Ltd., Tokyo, Japan
[22] Filed: Dec. 10, 1969
[21] Appl. No.: 883,829

[30] Foreign Application Priority Data
Dec. 26, 1968 Japan..............43/96169

[52] U.S. Cl.............................322/27
[51] Int. Cl..............................H02r 9/26
[58] Field of Search...................322/25, 27, 28, 73

[56] References Cited
UNITED STATES PATENTS
3,201,681  8/1965  Van Wilgen et al. ...........322/25 X
3,435,326  3/1969  Zechlin............................322/25

Primary Examiner—Bernard A. Gilheany
Assistant Examiner—W. E. Duncanson, Jr.
Attorney—Burgess, Ryan & Hicks

[57] ABSTRACT

A voltage regulating device for generators comprising a circuit for detecting the current through a load of a generator; an amplifier circuit for amplifying the output voltage of said load current detecting circuit and a phase control circuit which is driven by the output of said amplifier circuit for controlling the conduction starting phase of the exciting current of the generator in response to the characteristic of the load so as to control the output voltage of said generator and SCR-diode bridge circuit. The output pulses from said phase control circuit lag behind when the load current is high while the output pulses advance when the load current is low, so that the generator may have the characteristic that its output voltage may be dropped at a very steep slope when the load current is increased.

5 Claims, 12 Drawing Figures

Patented April 11, 1972

OUTPUT OF GENERATOR FOR SEPARATE EXCITATION 8

VOLTAGE ACROSS ZENER DIODE ZD-2

VOLTAGE ACROSS CAPACITOR C

OUTPUT OF PULSE TRANSFORMER PT

VOLTAGE APPLIED ACROSS FIELD WINDING 2

VOLTAGE ACROSS CAPACITOR C

OUTPUT FROM PULSE TRANSFORMER

VOLTAGE APPLIED ACROSS FIELD WINDING 2

VOLTAGE REGULATING DEVICE FOR GENERATORS

BACKGROUND OF THE INVENTION:

The present invention relates to generally a voltage regulating device for generators and more particularly a voltage regulating device for generators of the type which gives the so-called drooping characteristic to generators, that is the characteristic that the output voltage is very rapidly dropped when the load current is increased.

In generators, it is generally desired to maintain the output voltage constant or to vary the output voltage in a predetermined manner depending upon the characteristics of the loads of the generator. For this purpose, various voltage regulators have been proposed and used in practice. For example, in the voltage regulators for generators, a resistor is connected in series to the exciting winding of the generator so as to control the exciting current, or the number of turns of the shunt winding or the resistance of the series winding of the series differential winding is so selected, thereby the exciting flux or the exciting current is controlled in order to control the output voltage. However, in the conventional voltage regulating devices of the type described above, there is a problem that the loss due to the series differential coil and/or the field current is rather greater, accordingly, the efficiency of the generator is inevitably decreased.

Accordingly one of the objects of the present invention is to provide an output voltage regulating device for generators having a high efficiency.

Another object of the present invention is to provide a voltage regulating device which can adjust the output voltage over a wide range depending upon the characteristics of various loads.

A further object of the present invention is to provide a voltage regulating device for generators simple in construction and compact in size.

SUMMARY OF THE INVENTION

Briefly in the voltage regulating device in accordance with the present invention, the load current is detected by a load current detecting circuit whose output is amplified by a differential amplifier circuit, and the output from the amplifier circuit is applied to a circuit to control the starting phase of the exciting current, which is adapted to control the phase with which the exciting current from an exciter starts to flow through the exciting winding of the generator, so that the exciting current is increased or decreased. The phase control circuit is further provided with a circuit which is adapted to lag the phase more and more as the load current is increased so that the exciting current is decreased, and the load current vs. output voltage curve of the generator may have the so-called drooping characteristic.

According to an embodiment of the present invention, various drooping curves may be obtained, taking the resistances of variable resistors as the parameter.

The phase control circuit in accordance with the present invention is further provided with a circuit which is adapted to control the exciting current in such a manner that the output voltage of the generator has no drooping curve. In this case, it is also possible; to obtain various voltage-current characteristics, taking the resistance of the variable resistors as the parameter.

The output, that is the pulses derived from the phase control circuit are applied to the gates or control electrodes of the SCR-diode bridge circuit in order to cause the conduction of the exciting current. The bridge circuit comprises diodes and thyristors and is adapted to obtain full-wave rectification of the current from the exciter. That is, when the pulses from the phase control circuit are applied to the gates or control electrodes of the thyristors, the exciting current starts to flow through the exciting winding of the generator. Therefore, the quantity or magnitude of the exciting current is controlled by the phase relationship of the pulses relative to the rectified exciting current, thereby controlling the output voltage of the generator.

The above and other objects, features and advantages of the present invention will become more apparent from the following description of the illustrative embodiment thereof with reference to the accompanying drawing.

DESCRIPTION OF THE PREFERRED EMBODIMENT

Figure 1:
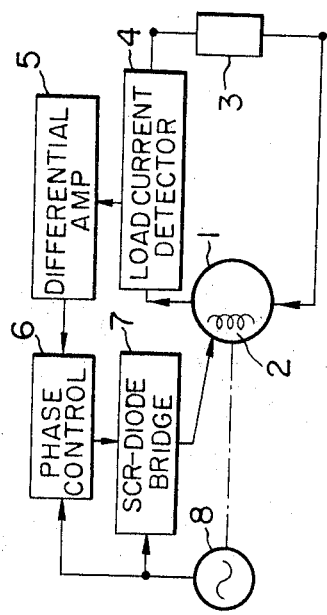
FIG. 1 is a block diagram of one embodiment of the present invention.

Referring to FIG. 1 illustrating a block diagram of one embodiment of the present invention, reference numeral 1 designates a constant-voltage DC shunt generator; 2, a field winding thereof; 3, a load thereof; 4, a load current detecting circuit; 5, a differential amplifying circuit for amplifying the electrical signals derived from the detecting circuit 4; 6, a phase control circuit; 7, a SCR-diode bridge circuit; and 8, an exciter which rotates in synchronism with the generator 1.

Figure 2:
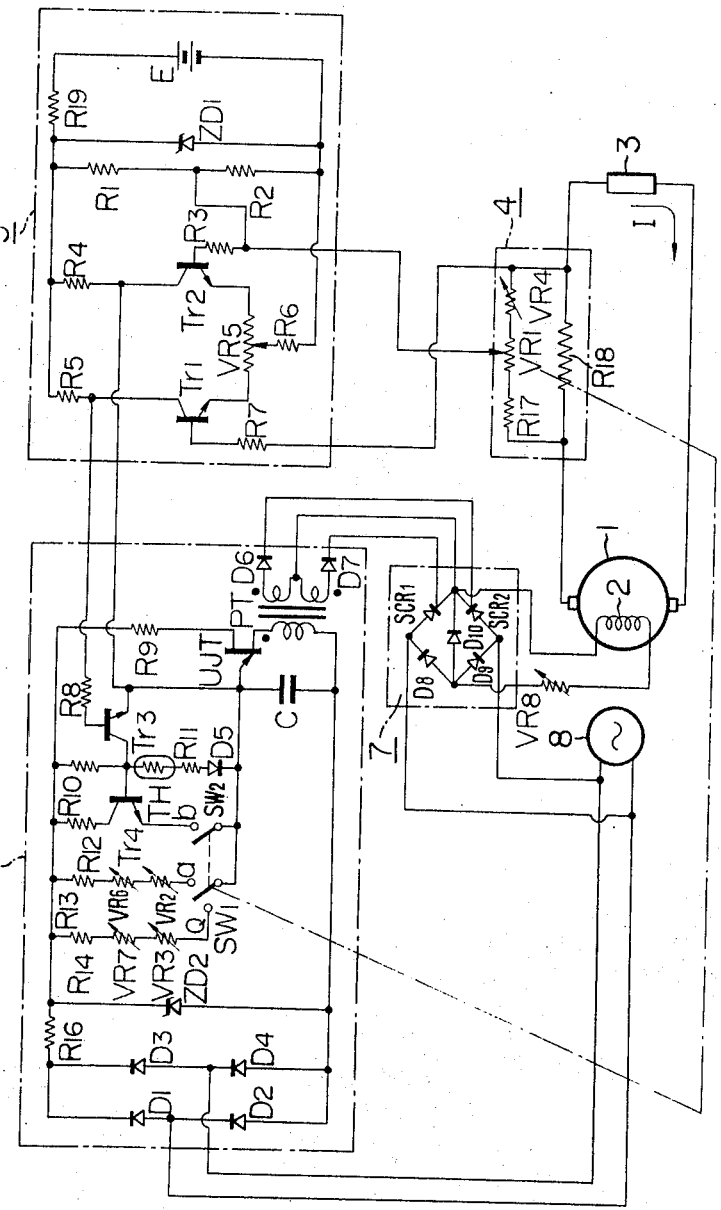
FIG. 2 is a circuit diagram thereof.

FIG. 2 is a circuit diagram of the embodiment illustrated in block diagram in FIG. 1. The reference numerals are used to designate same components. The load current detecting circuit 4 comprises a very low resistor $R_{18}$ having a resistance of the order of, for example, 0.0005 ohms, a fixed resistor $R_{17}$ and variable resistors $VR_1$ and $VR_4$. The differential amplifier circuit 5 comprises transistors $Tr_1$ and $Tr_2$ Zener diode $ZD_1$, a power source E, fixed resistors, $R_1$, $R_2$, $R_3$, $R_4$, $R_5$, $R_6$, $R_7$ and $R_{19}$ and an variable resistor $VR_5$. The phase control circuit 6 comprises transistors $Tr_3$ and $Tr_4$, a uni-junction transistor UJT, a Zener diode $ZD_2$, diodes $D_1$, $D_2$, $D_3$, $D_4$, $D_5$, $D_6$ and $D_7$, a capacitor C, a pulse transformer PT, fixed resistors $R_8$, $R_9$, $R_{10}$, $R_{11}$, $R_{12}$, $R_{13}$, $R_{14}$ and $R_{16}$, variable resistors $VR_2$, $VR_3$, $Vr_6$ and $VR_7$, a thermistor TH and change-over switches $SW_1$ and $SW_2$. The SCR-diode bridge circuit 7 comprises diodes $D_8$, $D_9$ and $D_{10}$ and thyristors $SCR_1$ and $SCR_2$.

Figure 3A:
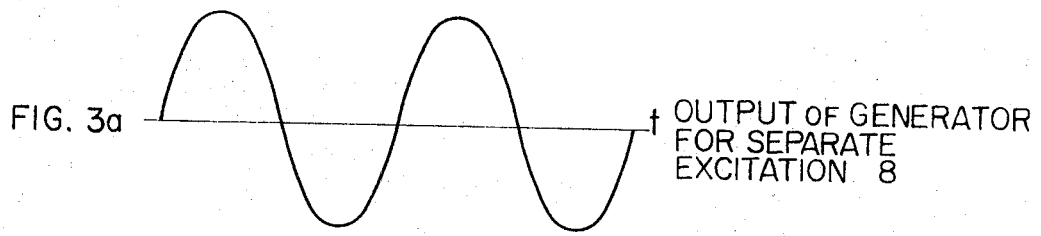
FIG. 3 is a representation of voltage waveforms at various points in FIG. 2.
Figure 3B:
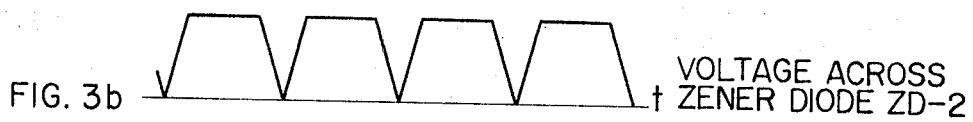
Figure 3C:
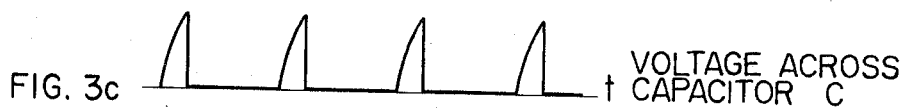
Figure 3D:

Next the mode of operation will be described in detail hereinafter. When there is no load, the voltage detected by the load current detecting circuit 4 is zero, so that the output voltage of the differential amplifier circuit 5 is also zero, because the variable resistor $VR_5$ is so adjusted that the output voltage may be zero when the voltage detected is zero. Thus, when the switches $SW_1$ and $SW_2$ are changed over to the contacts a and b no current flows through the base electrode of the transistor $Tr_3$, so that the transistor is cut off. On the other hand, the current flows to the base electrode of the transistor $Tr_4$ through the diode $D_1$ and $D_3$, the resistors $R_{16}$ and $R_{10}$, the base and emitter electrodes of the transistor $Tr_4$, the switch $SW_2$ and the diode $D_2$ or $D_4$ from the exciter 8. Therefore, the collector current flows from the exciter 8 through the diode $D_1$ or $D_3$, the resistor $R_{16}$ and $R_{12}$, the collector and emitter electrodes of the transistor $Tr_4$, the switch $SW_2$, the capacitor C and the diode $D_2$ or $D_4$. The capacitor C is, therefore, charged with the voltage shown in FIG. 3(c) and as the capacitor C is charged, the unijunction transistor UJT is made conductive through its emitter and base electrodes, so that the charged electrons of the capacitor C are rapidly discharged, thereby the primary winding of the pulse transformer PT is excited. Thus, across the secondary winding of the pulse transformer PT are derived the pulses, as shown in FIG. 3(d), which are in synchronism with the voltage waveform of the output from the exciter 8.

Figure 3E:
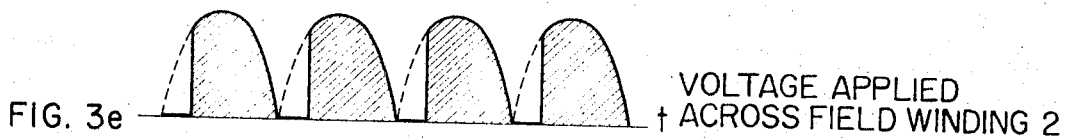
Figure 3F:
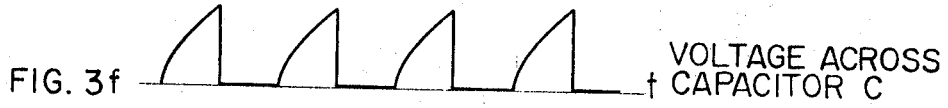
Figure 3G:
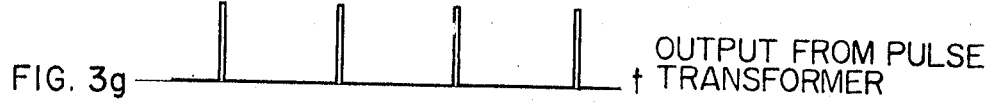
Figure 3H:
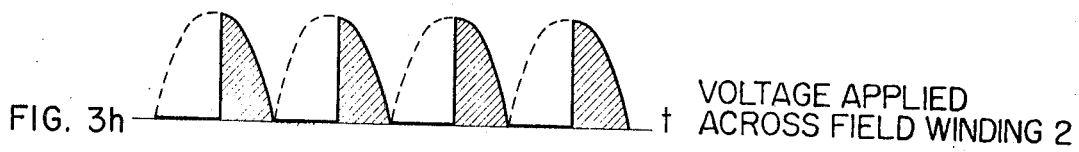

These pulses gate on the thyristors $SCR_1$ and $SCR_2$ of the SCR-diode bridge circuit 7 so as to drive them in the conductive state, thereby the no-load exciting current due to the voltage having the waveform shown in FIG. 3(e) is applied to the exciting winding 2 of the generator 1. In this case, the variable resistor $VR_8$ serves to set the no-load voltage of the generator 1. When the current I flows through the load 3, the potential at the output terminal of the load current detecting circuit 4 drops so that the base electrode of the transistor $Tr_1$ of the differential amplifier circuit 5 is reverse-biased by the voltage drop. Thus, the output voltage in proportion to the reverse bias voltage appearing at the output terminal of the amplifier circuit 5 causes the base current to flow into the base electrode of the transistor $Tr_3$ of the phase control circuit 6, so that the transistor $Tr_3$ is driven into the conductive state. Thus, it is seen that the collector current of the transistor $Tr_3$ flows from the exciter 8 through the diode $D_1$ and $D_3$, the resistors $R_{16}$ and $R_{10}$, the collector and emitter electrodes of the transistor $Tr_3$, the capacitor C and the diode $D_2$ or $D_4$. Therefore, the base potential or voltage of the transistor $Tr_4$ dropped due to the conduction of the transistor $Tr_3$, so that the base current is controlled, thereby increasing the equivalent resistance of the transistor $Tr_4$. The variation in the equivalent resistance causes the variation in the resistance of the resistance group (to be referred to as "automatically adjustable resistor group" hereinafter) comprising the series-resistor consisting of the resistor $R_{13}$, the adjustable resistors $VR_6$ and $VR_2$; resistor consisting of the resistor $R_{12}$ and the equivalent resistor of the transistor $Tr_4$. The variation in resistance, in turn, causes the variation in the charging time constant of the capacitor C. Thus, the capacitor C is charged as shown in FIG. 3(f), with thus determined time constant so that the pulses as shown in FIG. 3(g) is derived from the secondary winding of the pulse transformer as in the case of the no-load operation. The field current due to the controlled voltage, as shown in FIG. 3(h), flows into the field winding 2 of the generator, thereby the output voltage characteristic of the generator 1 is controlled. The adjustable resistor $VR_1$ is so set that the output voltage of the load current detecting circuit 4 by the steady current through an arbitrary load 3 may be always maintained constant thereby the positions P in FIG. 4, where the drooping characteristic of the output voltages of the generator 1 is started, may be determined. Therefore, when the variable resistor $VR_1$ of the load current detecting circuit 4 and the variable resistor $VR_2$ of the phase control circuit 6 are adjusted in unison with each other, the variable range of "the automatically variable resistor group" may be adjusted so that the field current may be controlled in response to the load. Thus, the output voltage characteristic of the generator having a drooping characteristic required by a specific load may be selected freely over a wide range as shown in FIG. 4.

Figure 4:
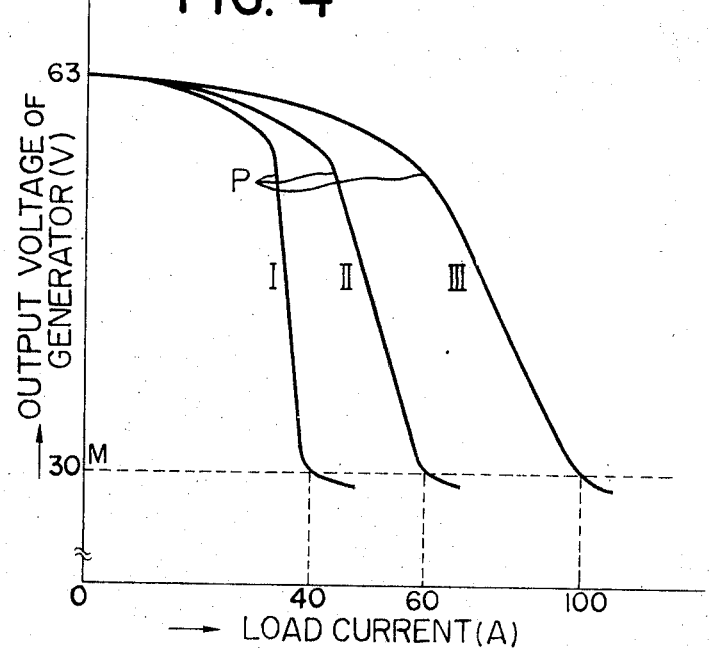
FIG. 4 shows some output voltage characteristic curves obtained by adjusting variable resistors ($VR_1$ and $VR_2$) in FIG. 2.

In FIG. 4, (I), (II) and (III) show respectively the drooping characteristics of the output voltage of the generator at 30 V, 40 A: 30 V, and 60 A and 30 V, and 100 A. When the transistor $Tr_4$ is completely cut off, the resistance of the time constant in the phase control circuit 6 becomes only the series resistance of the resistor $R_{13}$ and the variable resistors $VR_6$ and $VR_2$. This means that the time constant will not be permitted to vary any longer and that the time constant determined by the series resistance of the resistor $R_{13}$ and the variable resistors $VR_6$ and $VR_2$ together with the capacitor C becomes a constant value. Thus, the pulse signals derived from the pulse transformer PT will not lag longer than the above time constant, so that the field current of the generator will not be controlled beyond the value determined by the pulse signals which in turn are controlled by the above time constant. Thus the output voltage of the generator shows the drooping characteristic having a very gentle slope which is determined by the constant field current. This is illustrated in FIG. 4 by the curves below the line indicated by M. The above described characteristic is very important especially in the field of generators for welding and is called "drive characteristic." By providing a switch ($SW_3$) in series with the resistor (13) of FIG. 2 and opening the switch, the characteristics of extending the "P-M" curves straight downward can be obtained instead of the slanted curves.

Figure 5:
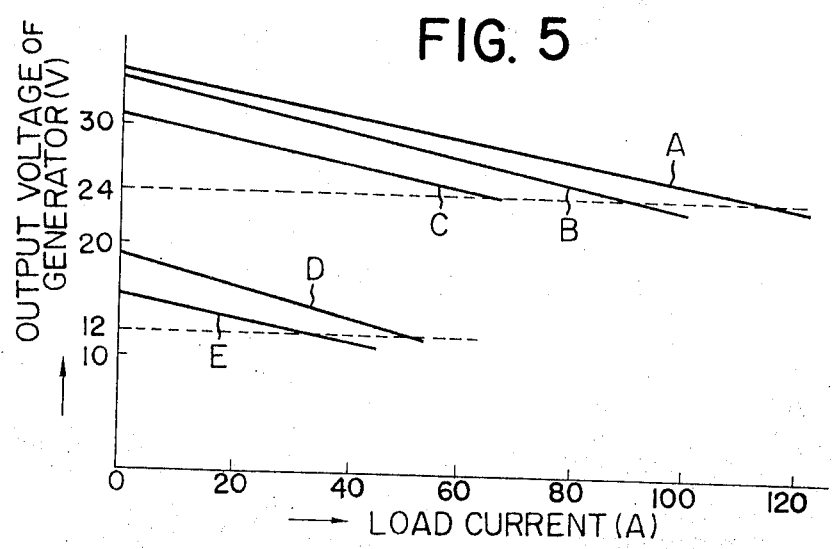
FIG. 5 shows also some output voltage characteristic curves obtained by adjusting a variable resistor ($VR_3$) and changing over switches ($SW_1$ and $SW_2$) to the contacts (Q) from the positions shown in FIG. 2.

When the switch $SW_1$ is changed over to the contact Q while the switch $SW_2$ is opened, the time constant is determinded by the series resistance of the resistor $R_{14}$, the variable resistors $VR_7$ and $VR_3$ and the capacitor C, so that various output voltage characteristic curves as shown in FIG. 5 may be obtained, in this case, the output voltage characteristic of the generator may be selected freely over by adjusted variable resistor $VR_3$. The curve (A) shows the characteristic at 24 V,110 A; (B),24 V,90 A;(C),24 V,70 A;(D),12 V,50 A;and (E),12 V,30 A.

When the exceedingly low resistance $R_{18}$ is employed as shown in FIG. 2 in the load current detecting circuit in accordance with the present invention, the load current may be detected without causing any decrease in the output efficiency of the generator.

It is noted that the present invention may be used in the voltage regulation of the self-excited generator.

I claim:
1. Voltage regulating device for DC generators comprising
   a detecting circuit for detecting the load current of the generator and producing an output voltage;
   an amplifier connected to said detecting circuit for amplifying the output voltage of said detecting circuit;
   a phase control circuit connected to the output of said amplifier circuit for generating a pulse train to control automatically the starting phase of the exciting current of said generator in response to the magnitude of the load current, said phase control circuit being provided with a circuit for controlling the phase of said pulse train to produce a generator output voltage having a drooping characteristic; and
   a SCR-diode bridge circuit driven by the output voltage of said phase control circuit and supplying said exciting current to the exciter of said generator.
2. A voltage regulating device as set forth in claim 1 wherein said load current detecting circuit comprises a resistor having a relatively low value connected in series with the load circuit and a group of resistors connected in parallel with said resistor of low value.
3. A voltage regulating device set forth in claim 1 wherein said amplifier circuit is a differential amplifier circuit.
4. A voltage regulating device as set forth in claim 1 wherein said phase control circuit is further provided with circuit means for controlling the phase of said pulse train so that the output voltage may be regulated without said drooping characteristic.
5. A voltage regulating device as set forth in claim 1 wherein said starting phase is variable as said load current varies.

* * * * *